G. S. Foster,
Wash-Board.

N° 56,031.  Patented July 3, 1866.

Witnesses
Samuel N Piper
George Andrews

Inventor
Gilbert S Foster
by his Attorney
R. W. Eddy

UNITED STATES PATENT OFFICE.

GILBERT S. FOSTER, OF SULLIVAN, MAINE.

IMPROVED WASHING-MACHINE.

Specification forming part of Letters Patent No. 56,031, dated July 3, 1866.

*To all whom it may concern:*

Be it known that I, GILBERT S. FOSTER, of Sullivan, of the county of Hancock and State of Maine, have invented a new and useful or Improved Washing-Machine; and I do hereby declare the same to be fully described in the following specification, and represented in the accompanying drawings, of which—

Figure 1:
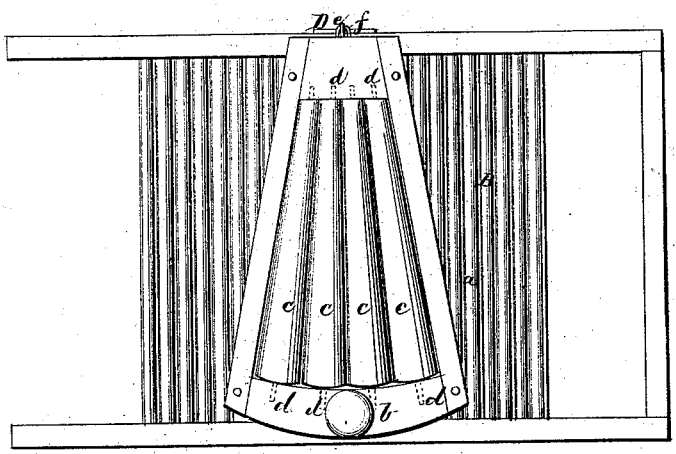
Figure 2:
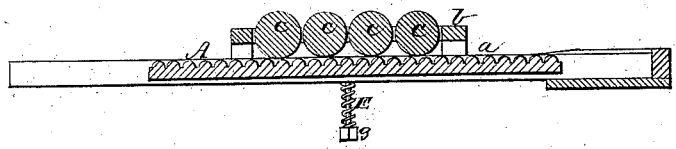
Figure 3:
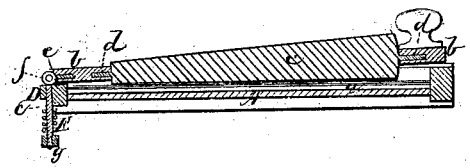

Figure 1 is a top view, Fig. 2 a longitudinal section, and Fig. 3 a transverse section, of it.

In the said drawings, A denotes a washboard of ordinary construction, the operative surface or part $a$ of which is fluted or corrugated crosswise. Over the said part $a$ is a sectoral rubber, $b$, and a series of conic frusta or rollers, $c\ c\ c\ c$, these latter being arranged within the said frame in manner as represented, and each of them being free to revolve on its axis. In other words, it has at each of its ends a journal which enters a corresponding bearing made in the frame, such journals being denoted in Fig. 1 by dotted lines, as shown at $d\ d$. At its smaller end the rubber B is connected to a pin or bolt, C, by means of a staple or hook, $e$, which projects from the said end and goes through an eye, $f$, made in the head of the bolt. The said bolt passes freely through and is supported by a suitable socket-piece or bearing, D, which is secured to the edge of the wash-board at or about its middle. A nut, $g$, is screwed on the lower end of the bolt, and between such nut and the socket-piece, and so as to encompass the bolt and bear against both the bolt and the socket-piece, is a helical spring, E.

At or near the larger end of the rubber a knob or handle, $h$, is affixed to the said rubber, and so as to project in manner as represented. By grasping this handle and bearing the rubber toward the wash-board, and moving it quickly back and forth lengthwise thereof, clothes may be washed when placed on the wash-board, the bolt and its spring serving to enable the smaller end of the rubber to rise, so as to accommodate the rubber to the clothes and keep the roller in close contact therewith.

The connection of the roller with the bolt by means as described and represented admits of the reciprocating circular movements of the rubber, as well as allows the rubber to be raised into any desirable angular position relatively to the wash-board.

When the machine is in use the wash-board is to be placed in a tub in the way in which a wash-board is commonly arranged therein when clothes are to be washed upon it by being rubbed thereon by manual labor alone with soap and water.

I do not claim a washing-machine composed simply of a rubber and a wash-board; but What I do claim as my invention is—

My improved washing-machine, as composed of the wash-board, the sectional rubber, the center bolt, and the spring, constructed, arranged, and combined substantially in manner and so as to operate as specified.

GILBERT S. FOSTER.

Witnesses:
T. H. SIMPSON,
JOHN U. HILL.